United States Patent [19]

Hooke

[11] 4,444,854

[45] Apr. 24, 1984

[54] ELECTROCHEMICAL CELL HAVING INTERNAL SHORT INHIBITOR

[75] Inventor: John W. Hooke, Gainesville, Fla.

[73] Assignee: General Electric Company, Gainesville, Fla.

[21] Appl. No.: 302,309

[22] Filed: Sep. 14, 1981

[51] Int. Cl.³ .............................................. H01M 2/14
[52] U.S. Cl. ...................................... 429/94; 429/144; 429/145; 429/225; 429/168
[58] Field of Search ............... 429/144, 145, 142, 141, 429/251, 252, 225, 228, 94, 249, 168

[56] References Cited

U.S. PATENT DOCUMENTS

| | | | |
|---|---|---|---|
| 2,484,787 | 10/1949 | Grant | 429/144 |
| 2,511,887 | 6/1950 | Vinal | 429/144 |
| 2,994,728 | 8/1961 | Herold | 429/249 X |
| 3,699,746 | 6/1972 | Devitt et al. | 429/94 |
| 3,753,784 | 8/1973 | Eisenacher et al. | 429/145 |
| 3,787,240 | 1/1974 | Gillman et al. | 429/145 |

OTHER PUBLICATIONS

User's Guide–Rechargeable Sealed Lead Acid Battery–General Electric Co. (1977).

Primary Examiner—Anthony Skapars
Attorney, Agent, or Firm—Henry J. Policinski

[57] ABSTRACT

An electrochemical cell comprises a spirally wound assembly, the assembly including a negative plate; a porous polyester layer disposed on each major surface of the negative plate; a porous, electrically non-conductive separator disposed on each of the polyester layers; and a positive plate disposed on one of the separators. The cell further includes a housing for enclosing the assembly and an electrolyte such that the electrolyte comes in contact with the plates, polyester layers and separators. The housing includes a pair of external terminals each of which being connected to one of the plates.

35 Claims, 3 Drawing Figures

ELECTROCHEMICAL CELL HAVING INTERNAL SHORT INHIBITOR

This is a continuation of application Ser. No. 116,634 filed Jan 29, 1980 now abandoned.

BACKGROUND OF THE INVENTION

The present invention relates to electrochemical cells, and specifically to a new sealed lead acid cell having improved performance and less susceptibility to shorting due to severe discharge and charge reversal.

A significant improvement in the well-known lead acid cell is the fully sealed lead acid cell which makes use of a cylindrical spiral-wound plate design for high energy density and low internal impedance, and can be used, i.e., charged and discharged, in any position. Such cell typically include spaced-apart positive and negative lead plates having a grid-like construction. The grid structure is filled with the active materials to form either positive (lead dioxide) or negative (sponge lead) electrodes. Sandwiched between the plates is a thin porous separator, the plate-separator assembly being wound into a compact, rugged cylindrical form. The separator electrically isolates the plates, and also functions as an effective wick to retain the cell's electrolyte (an aqueous solution of sulfuric acid) and keep it evenly distributed in the working area. The thin, highly porous separator keeps the ionic path between the plates short and permits rapid diffusion of electrolyte, these factors all contributing to the cell's ability to be discharged at high rates. The typical cell being described also generally includes means such as excess negative plate material, for minimizing the formation of gases in the cell, and a resealable vent for releasing internal pressure in the cell should unwanted gases be generated.

While the above-described cell represents a significant improvement over prior lead acid cells, it is desirable to further improve its performance and lengthen its life cycle, especially when the cell is subjected to extreme conditions. For example, when a lead acid cell is allowed to stand on open circuit, a slow electrochemical discharge occurs, the rate of self-discharge depending on the cell temperature and its state of charge. If a cell is allowed to self-discharge completely, i.e., until substantially all of the sulfate ion in the electrolyte has reacted with the plate materials, the lead sulfate becomes slightly soluble in the very dilute electrolyte and is free to diffuse into the separator between the plates. Attempting to recharge the cell in this condition may result in the formation of lead dendrites in the separator between the plates, eventually shorting the cell and ending its useful life. Similarly, where a discharged lead-acid cell is for one reason or another connected to a charge in reverse, the cell will accept a charge (the positive plate becomes a negative plate and vice versa), but is vulnerable to being shorted out by deposits of metallic lead and lead sulfate in the separator.

In addition, it has been found that there are certain problems associated with winding the plate-separator assembly of known cells. More particularly, in the manufacture of electrolytic cells or batteries, the positive and the negative plate materials are formed as strips which are then cut into cell strip lengths and wound, with separator material therebetween, into a coil. The coil is then inserted into a preformed cylindrical container. Electrolyte is added to the container and the container is closed and sealed. The sealed cell is then charged. The coiled positive plate is connected to the positive terminal and the coiled negative plate is connected to the negative terminal. Typically, the plate strips and separators are wound into the composite coiled assembly about a mandrel with a kiss roller or the inner surface of a cylindrical winding nest engaging one side of the coil as it is being wound. One of the difficulties with this arrangement, however, is that the forces required for winding are applied through the mandrel directly to the strips being wound. Thus, tensile forces are applied to the separators as the separators and plates are pulled by the arbor into the composite, coiled assembly. Because the separators have a low tensile strength, these winding forces can cause damage to and/or breakage of the separators, and can result in a shorted coil, which, of course, adversely affects overall cell quality.

Accordingly, it is an object of the present invention to provide a new and improved structure and method of manufacturing a sealed lead-acid cell which has an extended useful life, and which is less vulnerable to electrical shorts as a result of the cell being subjected to extreme conditions such as overdischarge or charge reversal.

It is another object of the present invention to provide a sealed lead-acid cell having an electrode assembly which may be wound automatically into a cylindrical coil without damage to the separators.

SUMMARY OF THE INVENTION

In accordance with the above-recited objectives, the present invention provides a new and improved rechargeable sealed lead-acid cell which includes an inner assembly comprising spaced-apart positive and negative plate members, a thin porous separator member disposed between the positive and negative plate members, and a short-inhibitor member sandwiched between the negative plate member and the separator member. In the preferred embodiment of the present invention, the plate-separator assembly is spiral-wound into a coil such that a short-inhibitor member is adjacent each of the major surfaces of the negative plate member; a separator member is adjacent each of the short-inhibitor members; and the positive plate member is adjacent one of the separator members. In accordance with the present invention each short-inhibitor member is formed from a fine mesh fabric, either woven or non-woven, comprising an acid and oxidation resistant polymer fiber such as polyester, polypropylene, etc., which may or may not be combined with a sintered polymer filler. The short-inhibitor member may have a thickness in the range of approximately 0.0009–0.010 inches, preferably about 0.0012 inches; a basic weight (gms/yd$^2$) in the range of approximately 18–30, preferably, about 20; a bulk density (gm/cm$^3$) in the range of approximately 0.64–0.78, preferably about 0.78; and a porosity in the range of approximately 40–50%. It will be noted that while the preferred location of the short-inhibitor member, as described above, is on the negative plate member of the cell, said short-inhibitor member may be located anywhere in the plate-separator sandwich. Each separator member, which may include one or more layers, may be typically formed from a non-woven glass micro fiber mat. It will be understood, however, that other types of separators in common use may also be used.

The subject plate/separator/short-inhibitor assembly is contained in a housing which also contains the electrolyte, typically an aqueous solution of sulfuric acid.

The housing of course includes a pair of external terminals each of which being connected to a positive or negative plate member.

It will be noted that while the subject assembly has been described above with respect to a lead acid cell, the assembly may also be used in cells having zinc electrodes.

DETAILED DESCRIPTION OF THE PREFERRED EMBODIMENTS

Figure 1:
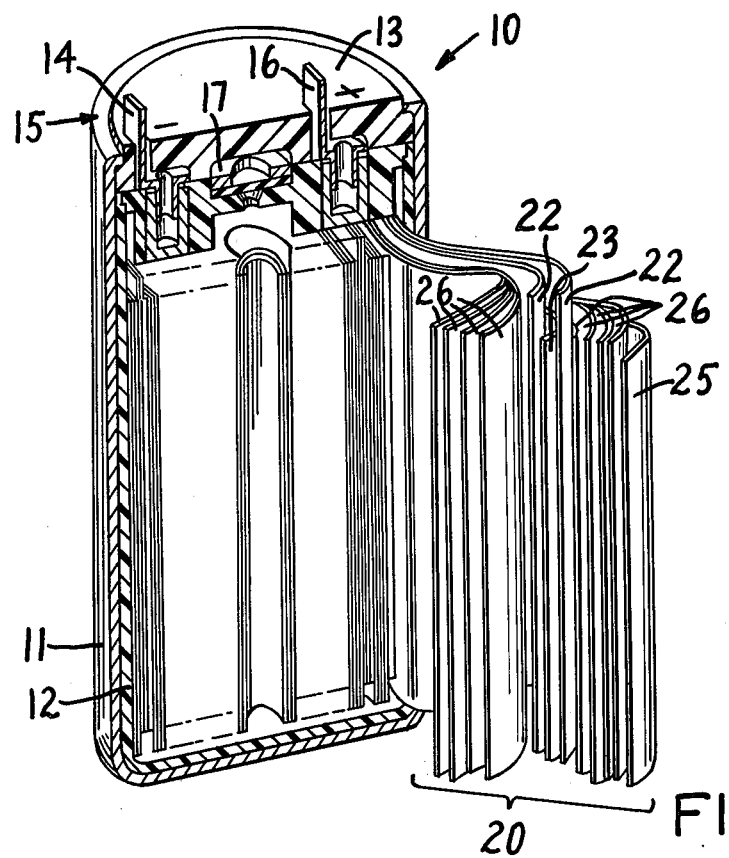
FIG. 1 is a perspective, cross-sectional view of a battery cell formed in accordance with the present invention.
Figure 2:
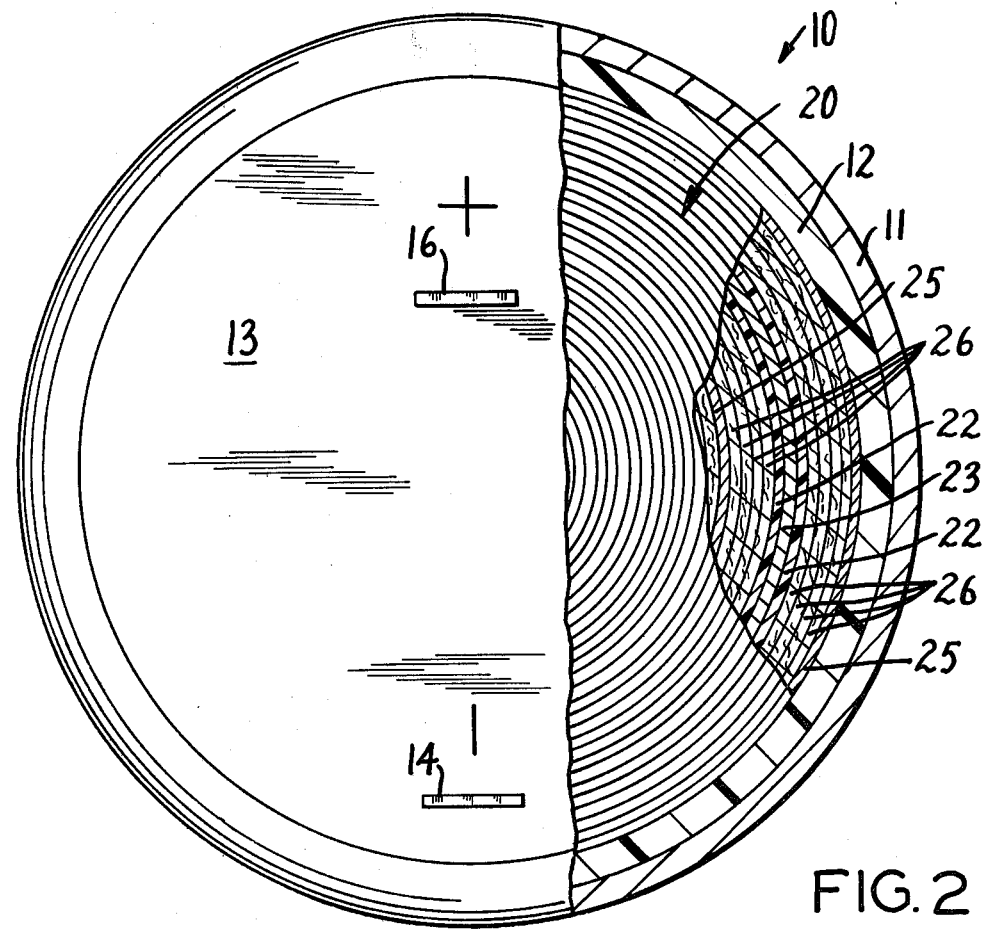
FIG. 2 is a plan view, broken away in part, of the subject battery cell of FIG. 1.

Referring to FIGS. 1 and 2, the electrochemical cell of the present invention 10 includes an inner assembly 20 which comprises a negative plate electrode 23; first and second short-inhibitor members 22, each of which being disposed adjacent one of the major surfaces of negative plate electrode 23; first and second separator members 26, each of which being disposed adjacent one of the short-inhibitor members 22; and a positive plate electrode 25 disposed adjacent one of the separator members 26. As illustrated in the drawings, the preferred embodiment comprises a spirally wound assembly 20, but it will be understood that a flat plate-separator-short inhibitor assembly may also be employed in cells which incorporate a starved electrolyte system. Where the subject cell is of the lead acid type, negative plate electrode 23 and positive plate electrode 25 are each constructed from lead metal grids which are cut into strips. These grids are filled with the active materials to form a negative (sponge lead) electrode 23 and a positive (lead dioxide) electrode 25. As indicated above, the present invention may also be employed with zinc electrode cells, and thus, in such an embodiment, the specific construction of the negative and positive electrode plates of the cell will be changed pursuant to known practice.

In accordance with the present invention, each short-inhibitor member 22 is formed from an inert, fine mesh fabric, either woven or non-woven, comprising an acid and oxidation resistant polymer fiber such as polyester, polypropylene, etc., which may or may not be combined with a sintered polymer filler. In the preferred embodiment of the invention, short-inhibitor members 22 are formed from polyester, and have a thickness in the range of approximately 0.0009–0.010 inches, preferably about 0.0012 inches, a basic weight (gms/yd$^2$) in the range of approximately 18 to 30, preferably about 20; a bulk density (gm/cm$^3$) in the range of approximately 0.64 to 0.78, preferably about 0.78; and a porosity in the range of approximately 40 to 50%, preferably about 45%. In addition, it is preferable that short-inhibitor members 22 have a length greater than plates 23 and 25 and separator members 26 such that extension portions 27 on members 22 are provided (See FIG. 3), the function of these extension portions being described below.

Separator members 26 are each formed from a thin, highly porous insulating material which, along with short-inhibitor members 22, completely electrically isolate positive and negative electrode plates 25 and 23. As mentioned above, separators 26 function as an effective wick to retain the cell's electrolyte and keep it evenly distributed in the working area. The porous separator 26 and inhibitor members 22 provide a short ionic path between plates 23 and 25 and permit rapid diffusion of the electrolyte. Preferably, separator members 26 are formed from a non-woven glass micro fiber mat, but other types of separators in common use may also be employed. In addition, as illustrated in FIGS. 1 and 2, each separator 26 may include one or more layers, such as, for example, four layers.

Figure 3:
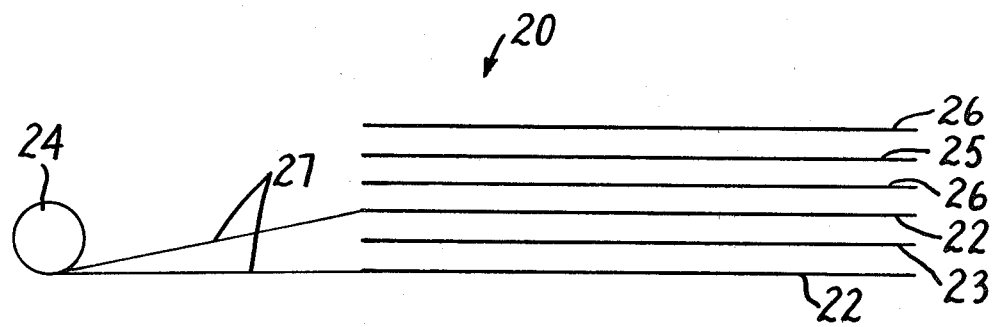
FIG. 3 is a schematic diagram illustrating the plate-separator-short inhibitor assembly of the subject invention prior to its being wound into a cylindrical coil.

In accordance with the invention, the electrode assembly 20 may be spirally wound using automatic belt winders, manual belt winders or an arbor winding technique such as that schematically illustrated in FIG. 3. More particularly, as shown in FIG. 3 (and referred to above), it is preferable that short inhibitor members 22 have a length greater than that of electrode plates 23 and 25, and separator members 26 such that extension portions 27 are provided on short inhibitors 22. In winding assembly 20, the arbor 24 pulls on inhibitor extensions 27, which in turn, also effects the winding of the electrode plates and separators. Because inhibitor members 22 have sufficient tensile strength to withstand the pull forces exerted by the arbor in winding the electrode/separator/short-inhibitor strips, the above-described problems associated with the tensile forces being directly applied to the fragile separator members, which generally have a very low tensile strength, are obviated.

Referring again to FIGS. 1 and 2, the coiled electrode assembly 20 of the invention is enclosed in a cylindrical housing 15, which preferably includes an inner case 12 formed from an electrically non-conductive material, e.g., a chemically stable polypropylene. Housing 15 also includes an outer metallic case 11, encasing inner case 12, which provides for mechanical rigidity and strength. Typically, outer case 11 may be formed from aluminum or steel. By providing housing 15 with inner and outer cases 12 and 11, respectively, the rate of gas diffusion through the housing wall is minimized, and loss of water from the electrolyte is virtually eliminated.

Housing 15 further includes an outer cover member 13 and a pair of terminals 14 and 16. Terminals 14 and 16 protrude through outer cover 13, with each terminal being electrically connected to either positive plate 25 or negative plate 23 within housing 15. Housing 15 may also include a resealable safety vent mechanism 17 which provides for the harmless venting of gasses that can be generated under extreme operating conditions such as an excessive overcharge rate. The electrolyte, typically an aqueous solution of sulfuric acid, is preferably added to the housing under pressure. The acid concentration within a cell varies with the state of charge, the concentration being highest when the cell is fully charged and lowest when the cell is discharged. The amount of electrolyte used in the cell is selected to permit efficient utilization of the active plate materials while still preventing the accumulation of any free electrolyte, i.e., unretained by the electrode plates 23 and 25, separators 26 and short-inhibitor layers 22. As indicated above, under normal use conditions, virtually no water is lost from the electrolyte. However, a small portion of the water may be temporarily involved in generating gas during overcharging.

The following examples are presented to compare results obtained in testing conventional cells against cells containing short-inhibiting layers in accordance with the invention.

EXAMPLE 1

Test cells were built in accordance with the preferred embodiment of the present invention, i.e., incorporating polyester short-inhibitor layers. Some of the test cells were filled with electrolyte in the conventional manner, the other test cells having the electrolyte forced into the cell under pressure to increase its rate of entry. After filling the cell, the pressure was relieved. Each short-inhibitor member had a thickness in the range of approximately 0.0009–0.010 inches, a basic weight in the range of approximately 18–30 grams per square yard, a density in the range of approximately 0.64–0.78 grams per cubic centimeter, and a porosity in the range of about 40 to 50%. In addition, control cells, i.e., cells not incorporating the subject polyester short-inhibitor members were prepared, some of said control cells being filled with electrolyte in the conventional manner, the other control cells having the electrolyte forced into the cell as described above with respect to some of the test cells.

All of the test cells and control cells were then subjected to a reversal test which comprises discharging the freshly formed cells at a rate of 250 mA for 24 hours. This completely discharged the cells, tending to drive them into polarity reversal. The control cells, regardless of how the electrolyte was added, tended to develop shorts by deposits of metallic lead and lead sulfate in the separator with ninety percent (90%) of the control cells developing shorts between the electrodes. None of the test cells developed shorts. Moreover, the test cells in which the electrolyte was added under pressure revealed no traces of lead sulfate in the separators or short-inhibitor members.

EXAMPLE 2

Test cells incorporating the short-inhibitor members of the present invention were prepared having the electrolyte forced into the cells under pressure, the pressure being relieved after the cells were filled. The short-inhibitor members in each cell had the same thickness, weight, density and porosity as the test cells of Example 1. In addition, control cells, i.e., cells which did not incorporate the short-inhibitor members of the present invention, were also prepared. The cells were cycled at 48° C. with each cycle comprising a charge period of 18 hours on a constant voltage of 2.45 volts, and a discharge of 1.8 amperes to a cell cutoff voltage of 1.4 volts. With "failure" being defined as a drop in capacity to one-half the rated capacity of 1.8 ampere-hours at the above discharge rate, the test cells lived, i.e., did not undergo "failure" for a period about twice as long as the control cells.

In summary, the present invention provides an improved electrochemical cell employing short-inhibitor members within the electrode plate-separator sandwich. This cell extends the time for the incidence of permanent cell failure as a result of shorting caused by deposits of lead dentrites or tracks in the plate insulation (separators) when the cell is subjected to abusive conditions such as overdischarge and cell reversal. In addition, the subject cell has a significantly improved cycle life over known cells. Further, the subject cell is very resistant to damage to the cell separator as a result of winding the plate-separator assembly, the relatively strong polyester short-inhibitor members being the portion of the assembly that carries the largest portion of the tensile forces during winding.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What is claimed is:

1. In an improved lead-acid electrochemical cell including a positive electrode, a negative electrode, a porous electrically non-conductive separator disposed between said positive and negative electrodes and having a side facing said negative electrode, a housing containing said electrodes and separator, and an electrolyte disposed within the housing and in contact with said electrodes and said separator, the improvement comprising: an inert porous short-inhibitor member disposed only intermediate said negative electrode and said side and in contact with said negative electrode, said short inhibitor member being a fine mesh fabric formed from an acid and oxidation resistant polymer.

2. An improved electrochemical cell as in claim 1 wherein said short-inhibitor member is a woven mesh fabric.

3. An improved electrochemical cell as in claim 1 wherein said short-inhibitor member is a non-woven mesh fabric.

4. An improved electrochemical cell as in claim 1 in which said short-inhibitor member includes a sintered polymer filler.

5. An improved electrochemical cell as in claim 1 in which said short-inhibitor member is formed from polyester.

6. An improved electrochemical cell as in claim 1 in which said short-inhibitor member is formed from polypropylene.

7. An improved electrochemical cell as in claim 1 in which said short-inhibitor member has a density in the range of approximately 0.64–0.78 grams per cubic centimeter, and a porosity in the range of approximately 40–50%.

8. An improved electrochemical cell as in claim 1 wherein the separator is a fibrous glass member.

9. An improved electrochemical cell as in claim 1 in which the electrodes, separator and short-inhibitor member are spirally wound into a coiled assembly.

10. A lead-acid electrochemical cell comprising:
a spirally wound electrode assembly, said assembly including a negative plate electrode; an inert porous short-inhibitor member disposed on and in contact with each major surface of said negative plate electrode, said short inhibitor member being a fine mesh fabric formed from an acid and oxidation resistant polymer; a porous electrically non-conductive separator member disposed adjacent each of said short-inhibitor members, each of said separator members having a side facing said negative electrode, each of said short-inhibitor members disposed only intermediate said side and said negative electrode; and a positive plate electrode disposed adjacent one of said separator members;
a housing for sealably enclosing said assembly;

an electrolyte disposed within said housing and in contact with said electrodes, short-inhibitor members and separator members; and a pair of external terminal, each of which being electrically connected to one of said electrodes.

11. An electrochemical cell as in claim 10 in which said short-inhibitor member is formed from polyester.

12. An electrochemical cell as in claim 10 in which said short-inhibitor member is formed from polypropylene.

13. An electrochemical cell as in claim 10 wherein each of said short-inhibitor members has a porosity of about 40–50% and a density of about 0.64–0.78 grams per cubic centimeter.

14. An electrochemical cell as in claim 10 wherein each separator member is a non-woven glass micro fiber mat.

15. An electrochemical cell as in claim 10 wherein the electrolyte is an aqueous solution of sulfuric acid.

16. An electrochemical cell as in claim 10 wherein each of said short-inhibitor members has a length greater than that of said electrodes and separator members so as to define an extension member on each short-inhibitor member for facilitating the winding of said electrode assembly.

17. An electrochemical cell as in claim 10 wherein said housing includes an inner case formed from an electrically non-conductive material and an outer case formed from a metallic material, said outer case enclosing said inner case.

18. A lead-acid electrochemical cell comprising:
a spirally wound electrode assembly, said electrode assembly including a negative plate electrode; a porous polyester layer disposed on and in contact with each of the major surfaces of said negative plate electrode, each of said polyester layers having a density of approximately 0.64–0.78 grams per cubic centimeter and a porosity of approximately 40–50%; a porous electrically non-conductive separator member disposed on each of said polyester layers and having a side facing said negative electrode, said polyester layers each disposed only intermediate said side and said negative electrode; and a positive plate electrode disposed on one of said separator members;
a housing for enclosing said assembly;
an electrolyte of an aqueous solution of sulfuric acid disposed within said housing and in contact with said plate electrodes, polyester layers and separator members; and
a pair of external terminals each of which being connected to one of said plate electrodes.

19. In an improved lead-acid electrochemical cell including a positive electrode, a negative electrode, a porous electrically non-conductive separator disposed between said positive and negative electrodes and having a side facing said negative electrode, a housing containing said electrodes and separator, and an electrolyte disposed within the housing and in contact with said electrodes and said separator, the improvement comprising: an inert porous short-inhibitor member disposed adjacent to and intermediate said negative electrode and said separator and disposed only intermediate said side and said negative electrode and in contact with said negative electrode, said short-inhibitor member being formed from a fine mesh polymer fiber which is acid and oxidation resistant and has a thickness in the range of approximately 0.0009–0.010 inches, a basic weight in the range of approximately 18–30 gms/yd$^2$, a bulk density in the range of approximately 0.64–0.78 gm/cm$^3$ and a porosity in the range of approximately 40–50%.

20. An improved electrochemical cell as in claim 19 wherein said short-inhibitor member is a woven mesh fabric.

21. An improved electrochemical cell as in claim 19 wherein said short-inhibitor member is a non-woven mesh fabric.

22. An improved electrochemical cell as in claim 19 in which said short-inhibitor member includes a sintered polymer filler.

23. An improved electrochemical cell as in claim 19 in which said short-inhibitor member is formed from polyester.

24. An improved electrochemical cell as in claim 19 in which said short-inhibitor member is formed from polypropylene.

25. An improved electrochemical cell as in claim 19 wherein the separator is a fibrous glass member.

26. An improved electrochemical cell as in claim 19 in which the electrodes, separator and short-inhibitor member are spirally wound into a coiled assembly.

27. A lead-acid electrochemical cell comprising:
a spirally wound electrode assembly, said assembly including a negative plate electrode; an inert porous short-inhibitor member disposed adjacent each major surface of said negative plate electrode, said short-inhibitor member being a fine mesh fabric formed from an acid and oxidation resistant polymer fiber and having a thickness in the range of approximately 0.0009–0.010 inches, a basic weight in the range of approximately 18–30 gms/yd$^2$, a bulk density in the range of approximately 0.64–0.78 gm/cm$^3$ and a porosity in the range of approximately 40–50%; a porous, electrically non-conductive separator member disposed adjacent each of said short-inhibitor members and having a side facing said negative electrode, said short-inhibitor members disposed only intermediate said side and said negative electrode and in contact with said negative electrode; and a positive plate electrode disposed adjacent one of said separator members;
a housing for sealably enclosing said assembly;
an electrolyte disposed within said housing and in contact with said electrodes, short-inhibitor members and separator members; and
a pair of external terminals; each of which being electrically connected to one of said electrodes.

28. An electrochemical cell as in claim 27 in which said short-inhibitor member is formed from polyester.

29. An electrochemical cell as in claim 27 in which said short-inhibitor member is formed from polypropylene.

30. An electrochemical cell as in claim 27 wherein each separator member is a non-woven glass micro fiber mat.

31. An electrochemical cell as in claim 27 wherein the electrolyte is an aqueous solution of sulfuric acid.

32. An electrochemical cell as in claim 27 wherein each of said short-inhibitor members has a length greater than that of said electrodes and separator members so as to define an extension member on each short-inhibitor member for facilitating the winding of said electrode assembly.

33. An electrochemical cell as in claim 27 wherein said housing includes an inner case formed from an electrically non-conductive material and an outer case formed from a metallic material, said outer case enclosing said inner case.

34. A sealed lead-acid electrochemical cell comprising:

a spirally wound electrode assembly, said electrode assembly including a negative plate electrode; a porous fine mesh polyester short inhibitor layer disposed only on each of the major surfaces of said negative plate electrode and in contact with said negative electrode, each of said polyester layers having a thickness in the range of approximately 0.0009–0.010 inches, a basic weight in the range of approximately 18–30 gms/yd$^2$, a density of approximately 0.64–0.78 gm/cm$^3$ and a porosity of approximately 40–50%; a porous electrically non-conductive separator member disposed on each of said polyester layers; and a positive plate electrode disposed on one of said separator members;

a housing for enclosing said assembly;

an elecytrolyte of an aqueous solution of sulfuric acid disposed within said housing and in contact with said plate electrodes, polyester layers and separator members; and a pair of external terminals each of which being connected to one of said plate electrodes.

35. In an improved lead-acid electrochemical cell including a positive electrode, a negative electrode, a porous electrically non-conductive separator disposed between said positive and negative electrodes and having a side facing said negative electrode, a housing containing said electrodes and separator, and an electrolyte disposed within the housing and in contact with said electrodes and said separator, the improvement comprising: an inert porous short-inhibitor member disposed intermediate one of said electrodes and said separator and further disposed only intermediate said side and said negative electrode and in contact with said negative electrode.

* * * * *